United States Patent [19]

Imataki et al.

[11] 4,204,239

[45] May 20, 1980

[54] ABNORMAL VOLTAGE PROTECTION DEVICE

[75] Inventors: Mitsumasa Imataki; Mikio Mochizuki; Yoshikazu Shibuya, all of Amagasaki, Japan

[73] Assignee: Mitsubishi Denki Kabushiki Kaisha, Tokyo, Japan

[21] Appl. No.: 908,234

[22] Filed: May 22, 1978

[30] Foreign Application Priority Data

May 21, 1977 [JP] Japan ........ 52-58989

[51] Int. Cl.[2] ........ H02H 9/04

[52] U.S. Cl. ........ 361/127

[58] Field of Search ........ 361/117, 120, 126, 127, 361/128, 129, 130; 338/21, 64, 234, 235

[56] References Cited

U.S. PATENT DOCUMENTS

| | | | |
|---|---|---|---|
| 1,783,052 | 11/1930 | Peek, Jr. | 361/129 X |
| 2,659,842 | 11/1953 | Teszner | 361/128 |
| 3,753,045 | 8/1973 | Osmundsen et al. | 361/130 X |
| 3,842,318 | 10/1974 | Nitta | 361/120 |

FOREIGN PATENT DOCUMENTS

| | | | |
|---|---|---|---|
| 525629 | 9/1921 | France | 361/130 |
| 965616 | 9/1950 | France | 361/128 |
| 4639902 | 11/1968 | Japan | 361/120 |

*Primary Examiner*—Harry E. Moose, Jr.

*Attorney, Agent, or Firm*—Wenderoth, Lind & Ponack

[57] ABSTRACT

In a grounded metallic housing of circular cross section three electrodes are disposed at equal angular intervals in a circle concentric with the housing to extending parallel to the axis of the latter. Three stacks of non-linear resistors are connected at one end to a corresponding one of the electrodes and at the other end to the peripheral edge of the bottom of the housing to be tilted radially outward.

2 Claims, 11 Drawing Figures

ABNORMAL VOLTAGE PROTECTION DEVICE

BACKGROUND OF THE INVENTION

This invention relates to an abnormal voltage protection device such as an arrestor for instantaneous protection of an electric circuit against any abnormal voltage.

Three-phase abnormal voltage protection devices of conventional construction comprise a metallic housing having a circular cross section connected to ground, and three stacks of non-linear resistors disposed at equal angular intervals equidistant from the longitudinal axis of the housing and adapted to be connected to the three-phases of an associated electric source respectively. For low AC voltages, the non-linear resistors function as a substantially perfect capacitor and has problems. It has been proven by theoretical analysis that due to stray capacitances developed between the resistor stacks and between each resistor stack and the metallic housing the non-linear resistors of each stack share unevenly the AC voltage applied across the stack. That is, that portion of the stack near to the high voltage side is in an overvoltage state resulting in electrical deterioration. Also upon the occurrence of a line to ground fault, the high voltage portions of the stacks for the sound phases have their voltage share greatly increased. Thus the non-linear resistors disposed in the high voltage portions of the stacks are subject to rapid deterioration.

Accordingly it is an object of the present invention to provide a new and improved three-phase abnormal voltage protection device including three stacks of non-linear reactors, one for each phase, wherein the voltage applied across each stack is uniformly divided among the non-linear resistors of each stack including those forming the high voltage portion thereof while the inter-phase effects is decreased to prevent the deterioration of the non-linear resistors and improve the performance.

SUMMARY OF THE INVENTION

The present invention provides a three-phase abnormal voltage protection device comprising a grounded metallic housing in the form of a hollow circular cylinder including a bottom, three independent electrodes, one for each phase of the three-phase system; disposed at equal angular intervals in a circle concentric with and within the metallic housing, the electrodes extending axially within the metallic housing, and three stacks formed of a plurality of non-linear resistors placed one upon another disposed within the metallic housing connected at one end to a portion of a respective electrode remote from the bottom of the metallic housing and at the other end to the bottom of the metallic housing and tilted radially outward with respect to the longitudinal axis of the metallic housing.

BRIEF DESCRIPTION OF THE DRAWINGS

The present invention will become more readily apparent from the following detailed description taken in conjunction with the accompanying drawings in which.

Figure 1:
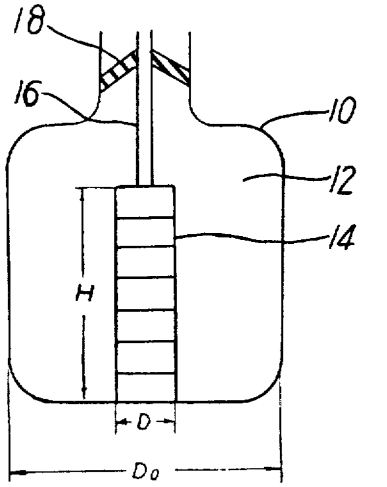
FIG. 1 PRIOR ART
FIG. 1 is a schematic view of a conventional abnormal voltage-protection device.
Figure 5:
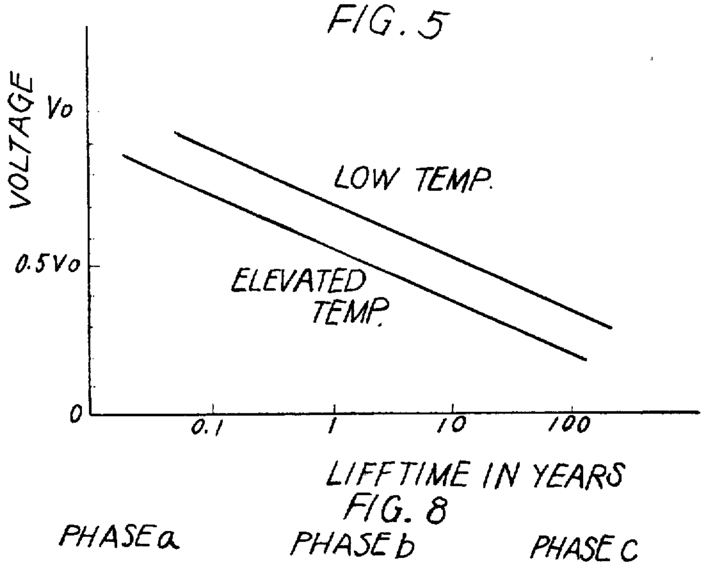
Figure 7:
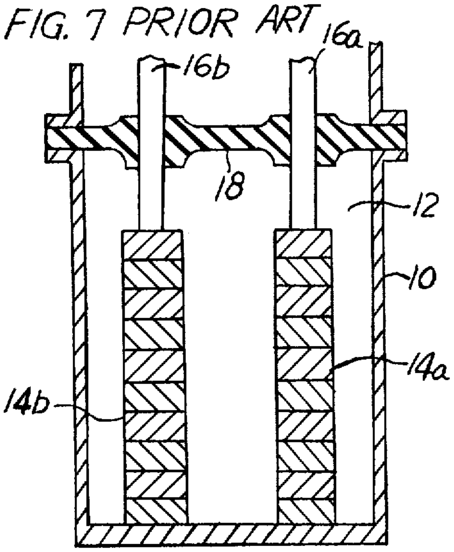
FIG. 7 PRIOR ART
Figure 8:
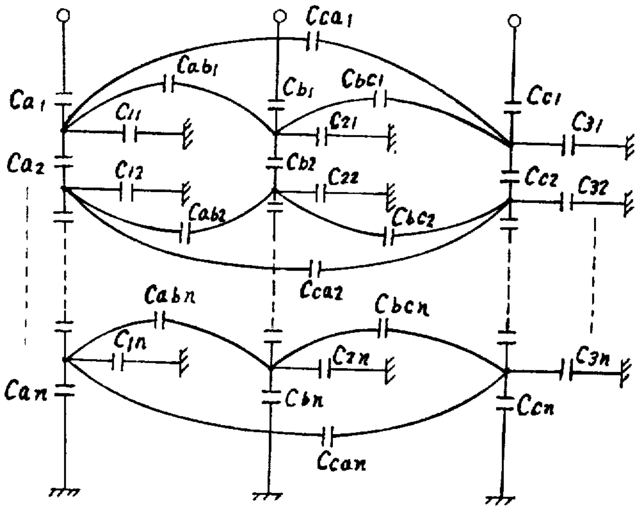
Figure 6:
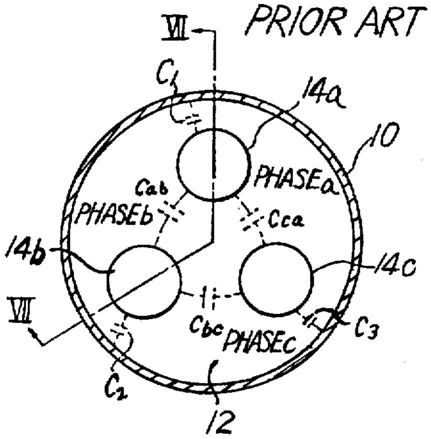
FIG. 6 PRIOR ART
Figure 9:
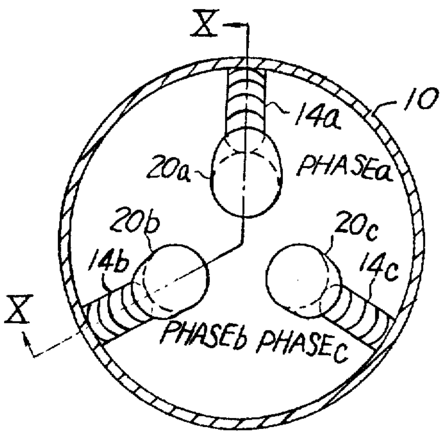
Figure 10:
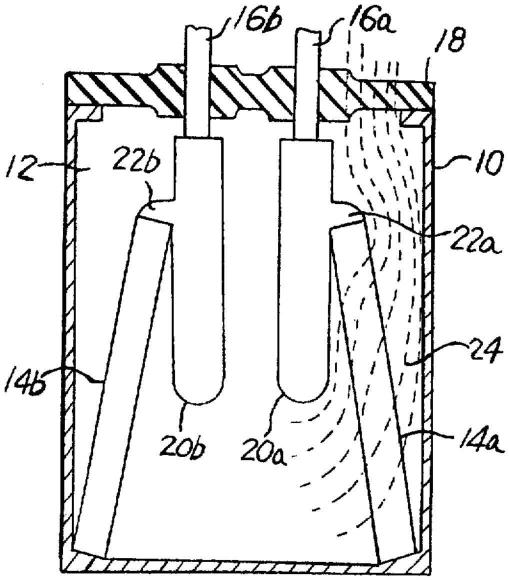

FIG. **4*a* is a graph illustrating the potential profile developed on the stack of non-linear resistors shown in FIG. 1**;

FIG. **4*b* is a graph illustrating the electric field established within the stack of non-linear resistors shown in FIG. 1**;

FIG. 5 is a graph illustrating the relationship between the voltage applied across a non-linear resistor and the life-time thereof;

FIG. 6 is a cross sectional view of a conventional three-phase abnormal voltage-protection device including three-phase components collectively accommodated in a single housing;

FIG. 7 is a longitudinal sectional view as taken along the line VI—VII of FIG. 6 with parts illustrated in elevation;

FIG. 8 is a diagram of an equivalent circuit of the arrangement shown in FIGS. 6 and 7;

FIG. 9 is a cross sectional view of one embodiment according to the three-phase abnormal voltage-protection device of the present invention; and FIG. 10 is a longitudinal sectional view as taken along the lines X—X of FIG. 9 with parts illustrated in elevation.

Throughout the Figures like reference numerals designate identical or corresponding components.

DESCRIPTION OF THE PREFERRED EMBODIMENT

Referring now to FIG. 1 of the drawings, there is illustrated a single-phase abnormal voltage-protection device of conventional construction. The arrangement illustrated comprises a metallic housing 10 in the form of a hollow circular cylinder having one end closed and the other end reduced in diameter, and an amount of a high dielectric strength gas 12, for example sulfur hexafluoride ($SF_6$), filling the interior of the housing 10. The housing 10 is connected to ground and includes a stack of resistors 14 having excellent non-linear characteristics and disposed on the longitudinal axis thereof. The stack of resistors 14 includes a lowermost resistor disposed at the closed end of the housing 10 and an uppermost resistor connected to an electric conductor 16 serving as the lead on the high voltage side. The conductor 16 extends through and is sealed by an electrically insulating spacer 18 hermetically closing the reduced diameter end of the housing 10. The non-linear resistor 14 is composed of a sintered body including essentially zinc oxide (ZnO).

The operation of the arrangement shown in FIG. 1 will now be described. The conductor 16 is connected to a high voltage terminal of an electric apparatus to be protected although the electric apparatus is not illustrated for sake of brevity. Incoming surges due to lightening strokes or the like are short circuited to ground through the conductor 18 and the stack of non-linear resistors 14.

Figure 2:
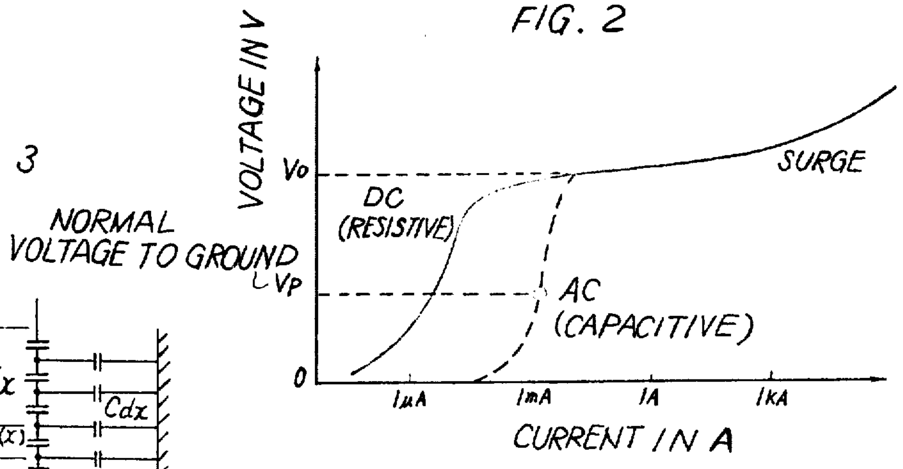
FIG. 2 is a graph illustrating the voltage-to-current characteristic of the arrangement shown in FIG. 1.

Sintered zinc oxide elements employed as the non-linear resistors 14 typically have the voltage-to-current characteristic shown in FIG. 2. In FIG. 2 the abscissa represents current in amperes on a logarithmic scale and the ordinate represents the voltage in volts. The curve illustrates the direct current or high current surge characteristic and indicates that the voltage across the non-linear resistor is maintained substantially constant over a wide range of currents. Therefore, a rise in voltage across the arrangement of FIG. 1 can be suppressed to a low magnitude.

On the other hand, when an AC voltage is applied across the arrangement of FIG. 1, the resulting voltage-to-current characteristic in the low current region is shown by the dotted line in FIG. 2 and different from that for direct current. The dotted line illustrates the peak value of the AC voltage versus the peak value of the alternating current. This difference between the two characteristics results from the sintered zinc oxide element having an electrostatic capacity and occurs with various non-linear resistors including sintered zinc oxide. However for AC voltages in excess of a certain magnitude, the voltage-to-current characteristic for AC becomes identical to that for direct current.

From FIG. 2 it is seen that, when the voltage exceeds a magnitude $V_o$, the AC characteristic approximately coincides with the DC characteristic while the two characteristics are different from each other for voltages lower than the magnitude $V_o$. For the sintered zinc oxide element, the magnitude of the current corresponding to the voltage $V_o$ is normally equal to or higher than 1 milliampere. However, the stacks of non-linear resistors included in AC arresters always have applied thereacross an AC line voltage called a "normal voltage to ground". This normal voltage to ground is selected to be lower than the voltage $V_o$, for example, at a level designated by $V_p$ shown in FIG. 2 in view of the relationship between the lifetime of sintered zinc oxide elements and the voltage applied thereacross as will be described hereinafter.

As the sintered zinc oxide element functions as a substantially perfect capacitor with respect to such low AC voltages, the following problems arise:

In the arrangement of FIG. 1, stray capacitances are developed between the non-linear resistors 14 and the housing 10. Taking into account those stray capacitances, it is necessary to consider how a low AC voltage such as the normal voltage to ground applied across the resistor stack is divided among the non-linear resistors on the basis of the equivalent circuit of the arrangement of FIG. 1 such as shown in FIG. 3.

Figure 3:
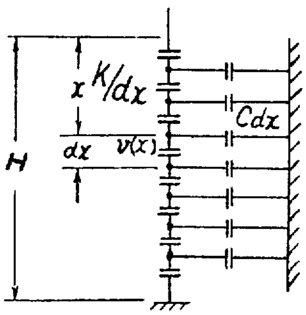
FIG. 3 is a diagram of an equivalent circuit of the arrangement shown in FIG. 1.

In FIG. 3, H designates the total length of the stack of non-linear resistors 14 (see also FIG. 1), x the distance of a point to be considered measured from the high voltage end of the stack, dx the differential of the distance x required for effecting the differentical calculation below, K/dx the electrostatic capacity of a portion of the element having a length dx, and Cdx designates the electrostatic capacity developed between the portion of the element having the length dx and the metallic housing 10. Further a voltage V is applied across the stack of non-linear resistors 14 and v(x) designates the potential at the point x. Then the relationship $$v(x)Cdx = \frac{d}{dx}\left[\frac{dv(x)}{dx}\cdot dx\cdot\frac{K}{dx}\right]dx$$

holds. Assuming that the C and K are independent of x and therefore may be assumed to be constant, the relationship is reduced to $$\frac{d^2v(x)}{dx^2} = \frac{C}{K}\,v(x).$$

Assuming that the boundary conditions V(o)=V and v(H)=0 holds, the solution of the above differential equation is $$v(x) = V\frac{\sinh\left[\sqrt{\frac{C}{K}}\,(H-x)\right]}{\sinh\left[\sqrt{\frac{C}{K}}\,H\right]}.$$

Figure 4A:
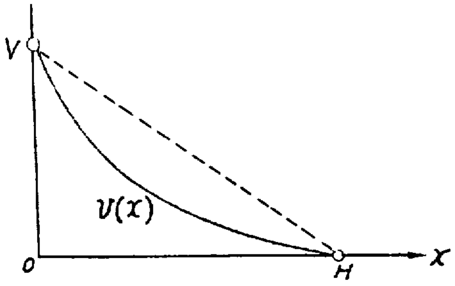

A potential profile on the stack of non-linear resistors expressed by the above expression is shown by the solid line in FIG. 4a wherein the abscissa represents the distance x and the ordinate represents the potential. If the stack of non-linear resistors is replaced by a fixed resistor, then the resulting potential profile is linear as shown at dotted line in FIG. 4a.

From the above expression for v(x) and therefore FIG. 4a it is seen that the potential profile as shown by the solid line is different from the linear potential profile as shown by the dotted line and that its deviation from the linear potential profile is increased as the total length H of the resistor stack increases.

Figure 4B:
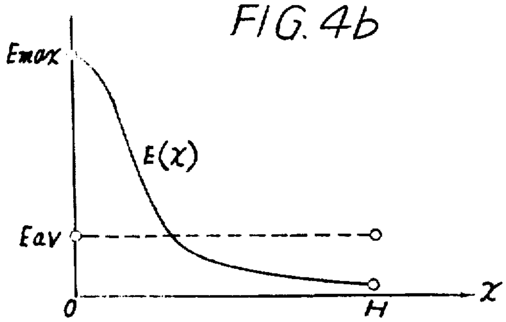

As a result, the electric field E(x ) established within the stack of non-linear resistors and defined by E(x)=|dv(x)/dx| is very non-uniform as shown by the solid curve in FIG. 4b wherein E(x) is plotted in ordinate against the distance x in abscissa. As shown in FIG. 4b the maximum magnitude $E_{max}$ of the electric field appears on the high voltage side of the non-linear resistor stack corresponding to x=0 and is extremely high as compared with the average magnitude $E_{av}$ (see FIG. 4b). Under these circumstances, that portion of the non-linear resistor stack near to the high voltage side is in an overvoltage state in which the overvoltage is much higher than the normal voltage $V_p$ to ground. If such an overvoltage is always applied to the non-linear resistor such as a sintered zinc oxide element, then the resistor or element is generally electrically deteriorated. FIG. 5 shows one example of the voltage-to-lifetime curve for zinc oxide elements. In FIG. 5 the voltage is plotted in ordinate against the lifetime in abscissa in years on a logarithmic scale. The upper curve of FIG. 5 describes a zinc oxide element at a low temperature while the lower curve illustrates the characteristics of the element at an elevated temperature. As shown in FIG. 5, the lifetime rapidly decreases as the voltage approaches the magnitude $V_o$ (see FIG. 2).

From the foregoing it will be appreciated that in the conventional construction of abnormal voltage-protection devices, the normal voltage to ground in biased toward the high voltage saide resulting in the disadvantages rapid deterioration in that portion of the non-linear resistor stack near to the high voltage side.

FIG. 6 shows in a cross section a three-phase abnormal voltage protection device or a three-phase arrester device of conventional construction including three-phase components collectively disposed in a single metallic housing. FIG. 7 shows a longitudinal section thereof taken along the line VII—VII of FIG. 6. The arrangement illustrated is different from that shown in FIG. 1 only in that in FIGS. 6 and 7 three stacks of non-linear resistors 14a, 14b and 14c, one for each of the three-phases a, b and c, are disposed within a single metallic housing 10 having a circular cross section at equal angular intervals and equidistant from the longitudinal axis of the housing 10 and three electric conductors 16a, 16b and 16c are extended through and sealed through a common electrically insulating spacer 18 closing the other end of the housing 10. The conductors 16a, 16b and 16c are connected to the stacks of non-linear resistors 14a, 14b and 14c respectively.

As in the arrangement of FIG. 1, the stacks of non-linear resistors 14a, 14b and 14c for the phases a, b and c present respective stray capacitances $C_1$, $C_2$ and $C_3$ to the grounded metallic housing 10. Also, each pair of the adjacent stacks of non-linear resistors have a stray capacitance developed therebetween. Cab, Cbc and Cca designate those stray capacitances developed between the phases a and b, between the phases b and c, and between the phases c and a respectively. Assuming that each stack includes n non-linear resistors, each of those stray capacitances can be divided into stray capacitances relative to the n non-linear resistors placed on one upon another to form an equivalent circuit to the arrangement illustrated in FIGS. 6 and 7 such as shown in FIG. 8. Each of the different stray capacitances is designated by reference numerals and characters identifying the stray capacitance from which it is divided with the last suffix denoting the corresponding non-linear resistor within the stack. For example, $C_{11}$ designates the stray capacitance developed between the uppermost resistor for the phase a as viewed in FIG. 7 or 8 and the grounded housing 10 and Cbcn designates the stray capacitance developed between the lowermost resistors as viewed in FIG. 7 or 8 for the phases b and c. In FIG. 8, the equivalent circuit for each phase is identical to that shown in FIG. 3 if the remaining two phases are disregarded.

Accordingly, the arrangement as shown in FIGS. 6 and 7 has had the same disadvantages as that illustrated in FIG. 1. Further, as each stack of non-linear resistor has inter-phase stray capacitances, the inter-phase stray for capacitance may change in accordance with the particular system condition. For example, upon the occurrence of a line to ground fault in the phase a, the stray capacitances Cab and Cca increase because these capacitances are developed as if the grounded housing 10 were decreased in diameter. As a result, that portion of the non-linear resistor stack bearing a high voltage for each of the phases b and c has an increased share of the voltage resulting in the disadvantage that this portion of the stack is even more rapidly deteriorated.

The present invention contemplates to elimination of the disadvantages of the prior art practice as described above by the provision of a unique disposition of the non-linear resistor stacks.

FIGS. 9 and 10 show an embodiment of the three-phase abnormal voltage protection device of the present invention. The arrangement illustrated comprises a metallic housing 10 in the form of a hollow circular cylinder including a bottom, and three electric conductors 16a, 16b and 16c disposed at equal angular intervals in a circle coaxial with the housing 10 extending through and sealed by an electrically insulating spacer 18 hermetically closing the other end of the housing 10 which is filled with an a high dielectric strength gas 12 such as sulfur hexafluoride ($SF_6$) as in the arrangement shown in FIGS. 6 and 7. The conductors 16a, 16b and 16c are adapted to be electrically connected to terminals for the three-phases a, b and c of an electric apparatus to be protected (not shown).

Those ends of the electrically conductors 16a, 16b and 16c extending into the interior of the housing 10 are connected to respective cylindrical electrodes 20a, 20b and 20c extending parallel to the longitudinal axis of the housing 10. The cylindrical electrodes 20a, 20b and 20c serve as shielding conductors. A plurality of non-linear resistors 14a are placed one upon another within any suitable, electrically insulating sleeve or the like (not shown) to form an enclosed stack having both ends open. Then the stack thus formed is connected at one end to the upper portion as viewed in FIG. 10 of the electrode 20a and at the other end the bottom of the housing 10 to tilted radially outward with respect to the longitudinal axis of the housing 10. In the example illustrated, the stack of non-linear resistors 14a includes an upper end as viewed in FIG. 10 or a high voltage end thereof connected to a protrusion 22a directed radially outward disposed on the upper portion of the electrode 20a and a lower end or a ground voltage end thereof connected to the peripheral edge portion of the housing 10 bottom.

Stacks of non-linear resistors 14b and 14c similarly formed are connected between the electrodes 20b and 20c and the bottom of the housing 10 in the same manner as described above in conjunction with the non-linear resistor stack 14a. The non-linear resistors are preferably composed of sintered zinc oxide.

Since the electrodes 20a, 20b and 20c are located with respect to the grounded housing 10 as described above the resulting charged portion of the electrodes is moved toward the bottom of the housing 10 and equipotential lines are developed between each of the electrodes 20a, 20b or 20c and the grounded housing 10 which run substantially parallel to the axis of the associated electrode. In FIG. 10 dotted lines 24 depicts the potential profile formed by the equipotential lines as described above near the electrode 20a in the absence of the non-linear resistor stack 14a. By proper selection of the length, diameter and shape of the electrode 20a and the angle formed between the longitudinal axes of the electrode 20a and the grounded housing 10, the potential profile can be made substantially uniform. This is true in the case of the electrodes 20b and 20c. Then the stacks of non-linear resistors 14a, 14b and 14c are connected between the respective electrodes 20a, 20b and 20c and the bottom of the grounded housing 10. The substantially uniform potential profile near each of the electrodes is not disturbed from the standpoint of the electric field. Therefore the currents flowing through the non-linear resistors become constant with the result that the non-linear resistor can have a prolonged lifetime.

In summary, the present invention is characterized in that the stacks of non-linear resistors 14a, 14b and 14c are disposed between the associated electrodes 20a, 20b and 20c and the grounded housing 10 so that shared voltages of the respective non-linear resistors of each stack are substantially equal to the potential profile caused between the associated electrode and the grounded housing. Therefore, even though a system condition, for example the occurrence of a line to ground fault, would change the potential of the phase a, a variation in the potential profile on the stack of non-linear resistors for each of the phases b and c is scarcely affected. In other words, potential shared by the high voltage portion of the stack of each phase b or c does not increase and remains unchanged. Thus the lifetime of the non-linear resistors can be increased.

From the foregoing it is seen that the present invention provides a three-phase abnormal voltate protection device very simple in construction and therefore inexpensive.

While the present invention has been illustrated and described in conjunction with a single preferred embodiment thereof it is to be understood that numerous changes and modifications may be resorted to without departing from the spirit and scope of the present invention. For example, the electrodes may be tilted with respect to the longitudinal axis of the housing with the stacks of non-linear resistors disposed parallel to the longitudinal axis of the housing.

What we claim is:

1. A three-phase abnormal voltage protection device comprising:
   - a metallic housing in the form of a hollow circular cylinder including a bottom, said metallic housing being connected to ground;
   - three independent electrodes, one for each of the three phases, disposed at equal angular intervals in a circle concentric with and within said metallic housing, said electrodes extending within said metallic housing parallel to the longitudinal axis of said metallic housing;
   - three stacks formed of a plurality of non-linear resistors placed one upon another, each said stack having a first end connected to a portion of a corresponding one of said electrodes remote from said bottom of said metallic housing and a second end, tilted radially outward with respect to the longitudinal axis of said metallic housing, connected to said bottom of said metallic housing.

2. A three-phase abnormal voltage protection device as claimed in claim 1 wherein said non-linear resistor is composed of sintered zinc oxide.

* * * * *